United States Patent
Tarnow et al.

(10) Patent No.: US 8,941,956 B2
(45) Date of Patent: Jan. 27, 2015

(54) SWITCHING GROUND TETHER CIRCUIT

(75) Inventors: Andrew Colin Tarnow, Cambridge Springs, PA (US); Adam Carr Bennett, Erie, PA (US); Edward Michael Murphy, Erie, PA (US)

(73) Assignee: Railpower, LLC, Nicholasville, KY (US)

( * ) Notice: Subject to any disclaimer, the term of this patent is extended or adjusted under 35 U.S.C. 154(b) by 244 days.

(21) Appl. No.: 13/400,821

(22) Filed: Feb. 21, 2012

(65) Prior Publication Data

US 2013/0025494 A1  Jan. 31, 2013

Related U.S. Application Data

(60) Provisional application No. 61/511,593, filed on Jul. 26, 2011.

(51) Int. Cl.
H02H 9/04 (2006.01)
B61C 7/04 (2006.01)
H02H 9/08 (2006.01)

(52) U.S. Cl.
CPC .................................... *H02H 9/08* (2013.01)
USPC ............................................ 361/42; 105/53

(58) Field of Classification Search
USPC ......................................................... 361/42
See application file for complete search history.

(56) References Cited

U.S. PATENT DOCUMENTS

| | | | |
|---|---|---|---|
| 4,347,540 A | 8/1982 | Gary et al. | |
| 4,556,946 A | 12/1985 | Taniguti | |
| 4,558,304 A * | 12/1985 | Wand | 341/115 |
| 4,580,186 A | 4/1986 | Parker et al. | |
| 4,953,068 A * | 8/1990 | Henze | 363/17 |
| 5,057,698 A * | 10/1991 | Widener et al. | 307/66 |
| 5,329,222 A * | 7/1994 | Gyugyi et al. | 323/207 |
| 5,521,787 A | 5/1996 | Baker et al. | |
| 5,666,255 A | 9/1997 | Muelleman | |
| 5,680,301 A * | 10/1997 | Oughton et al. | 363/132 |
| 5,867,358 A | 2/1999 | Campbell | |
| 6,002,603 A * | 12/1999 | Carver | 363/98 |
| 6,069,811 A * | 5/2000 | Moriguchi et al. | 363/142 |
| 6,091,288 A * | 7/2000 | Moisin | 327/545 |
| 6,320,769 B2 * | 11/2001 | Kurokami et al. | 363/56.03 |
| 6,381,113 B1 | 4/2002 | Legatti | |
| 6,552,885 B1 | 4/2003 | Campbell et al. | |
| 6,829,556 B2 | 12/2004 | Kumar | |
| 6,888,708 B2 | 5/2005 | Brungs et al. | |
| 7,079,406 B2 * | 7/2006 | Kurokami et al. | 363/56.03 |
| 7,274,173 B2 * | 9/2007 | Inoshita et al. | 323/222 |
| 7,400,476 B1 * | 7/2008 | Hull, Jr. | 361/42 |
| 7,706,164 B2 * | 4/2010 | Nishi et al. | 363/146 |
| 8,049,455 B2 * | 11/2011 | Kitanaka | 318/563 |
| 8,570,005 B2 * | 10/2013 | Lubomirsky | 323/259 |
| 2008/0291707 A1 * | 11/2008 | Fang | 363/41 |
| 2009/0140577 A1 * | 6/2009 | Fishman | 307/82 |
| 2009/0283129 A1 * | 11/2009 | Foss | 136/244 |
| 2013/0063185 A1 * | 3/2013 | Ye et al. | 327/108 |

* cited by examiner

*Primary Examiner* — Jared Fureman
*Assistant Examiner* — Angela Brooks
(74) *Attorney, Agent, or Firm* — King & Schickli, PLLC

(57) ABSTRACT

A ground tether circuit is provided for a power circuit that includes a power source, at least one load and at least one rectifier. The ground tether circuit includes an adjustable voltage converter connected to the rectifier. The adjustable voltage converter includes a positive power switch, a negative power switch, an inductor, a current sensing device and a controller.

22 Claims, 6 Drawing Sheets

Fig. 3

SWITCHING GROUND TETHER CIRCUIT

This application claims priority to U.S. Provisional Patent Application Ser. No. 61/511,593 filed 26 Jul. 2011, the entire disclosure of which is incorporated herein by reference.

TECHNICAL FIELD

This document relates generally to ground fault systems and, more particularly, to a switching ground tether circuit that allows for varying the amount of ground current allowed as well as calculating the voltage at the location of any fault.

BACKGROUND SECTION

Grounded electrical systems have a low impedance connection between a grounded current carrying conductor (often referred to as a 'neutral') and a ground reference. This ground reference is often connected to earth in stationary system and chassis in vehicle systems. Should there be a fault (electrical connection) from one of the non-grounded conductors and another component of the electrical system at ground potential a fault current will flow back to the neutral through the low impedance connection. This fault current may then cause an over current condition on the non-grounded conductor causing over current protection (such as a fuse, circuit breaker, contactor) to open and remove power to the non-grounded conductor.

In certain applications it is desirable to reduce the fault current when current carrying conductors of an electrical system come into electrical contact with ground. One approach is to have an ungrounded system where none of the conductors are bonded to ground. In such cases, if any of the conductors fault to ground there will be no fault current flow, however this condition may not be evident and a second fault would then cause significant ground current to flow.

Prior art high impedance grounding systems such as illustrated in FIG. 1 are a mix between the grounded and ungrounded system. These systems have a resistance and or inductance between the neutral and ground references which limits fault current to levels which may be applied indefinitely. For example, companies make insulation monitoring devices which have hundreds of kilo Ohm's of resistance between a neutral reference and a ground reference. They can then measure the leakage current across this resistance. Some active devices send pulses with high frequency content across the high impedance (at line frequency, lower impedance at frequencies contained in the pulses) neutral to ground connection to measure system leakage. A disadvantage of high impedance systems is that they may be intolerant to small levels of leakage which would otherwise be acceptable. Systems that work by sending pulses through a higher frequency lower impedance path may take a significant amount of time to determine the level of electrical isolation between the ground and the system neutral.

Low impedance grounding systems are designed to allow for a significant, but limited, fault current to flow through the ground to neutral connection using some impedance to limit the current. On AC systems, the impedance may be made from inductive components with or without resistance. On DC systems, resistance is used for this current limited connection.

Typically, low impedance grounding systems are not designed to operate with the low impedance bonding path in place during a fault. These systems may clear the fault by:
a. Opening over current protection devices on the supply side as with a grounded system. This is typical in a utility system with impedance grounding on a neutral. While the protection device is open, power cannot flow.
b. Reducing power supplied to the electrical system until fault currents are reduced to acceptable levels. (See, for example, U.S. Pat. No. 6,829,556).
c. Opening the low impedance connection between the power system and ground. This is the standard action on locomotives with a 'Ground Relay' which opens to eliminate fault current flow through the ground resistor.
d. Opening the low impedance connection between the power system and ground, but leaving a second high impedance connection. This is done in (see for example, U.S. Pat. No. 5,867,358).

It is notable that real power consumption (and therefore the power dissipation) in a resistor is much higher than an inductive line reactor in an AC system for a given voltage and steady state current. In DC systems, there is not an option to limit the steady state fault current through a ground connection using an inductive coupling. Because of this, low impedance systems typically use very large resistors or are designed so that the resistor path is removed from the circuit very quickly after current flow begins in order to limit the energy dissipated by the resistor to a level which will not cause a thermal failure of the resistor. In locomotive systems, the opening of this resistor is often accomplished through a set of contacts of the Ground Relay which opens when the current through the impedance connection from the power system to the ground (locomotive chassis) exceeds a threshold. At the same time, systems often remove power from the locomotive power system by disabling electrical operation of the generating machine on the locomotive or by disconnecting devices with the fault such as traction motors which have internal ground faults.

SUMMARY SECTION

This document describes a switching ground tether circuit for a power circuit including a power source, at least one load and at least one rectifier. The switching ground tether circuit comprises an adjustable voltage converter. The adjustable voltage converter is connected to the DC side of the rectifier. Further, the adjustable voltage converter includes a positive power switch with a first freewheeling path connected between a positive DC link and a center point, a negative power switch with a second freewheeling path connected between a negative DC link and the center point and an inductor connected between the center point and system ground. Further, the converter includes a current sensing device connected between the inductor and the system ground. A controller controls operation of the positive power switch and the negative power switch. The controller is connected to the positive power switch, the negative power switch and the current sensing device.

The ground tether circuit may also include an optional DC link capacitor connected between the positive DC link and the negative DC link. Further, the circuit may include an optional current limited voltage source connected between the positive DC link and the negative DC link. The optional current limited voltage source includes a first isolated power supply and a second isolated power supply with one of the power supplies provided on each side of a second center point connected to a center ground. Further, a first current limiting resistor and first blocking diode are connected between the first isolated power supply and the positive DC link and a second blocking diode and second current limiting resistor are connected between the second isolated power supply and the negative DC link.

In accordance with yet another aspect a ground tether circuit is connected to a power system including at least one AC power source and/or a DC power source, at least one AC to DC converter connected between each of the AC power source and a common DC link connecting to all the power sources and loads directly or through converters. The ground tether circuit comprises an adjustable voltage converter. The adjustable voltage converter includes a positive power switch with a first freewheeling path connected between a positive DC link and a center point, a negative power switch with a second freewheeling path connected between a negative DC link and the center point and an inductor connected between the center point and the system ground. A current sensing device is connected between the inductor and the system ground. In addition, a controller is provided for controlling operation of the positive power switch and the negative power switch. The controller is connected to the positive power switch, the negative power switch and the current sensing device.

In accordance with yet another aspect of the present invention a locomotive is provided. The locomotive comprises a body, a DC traction system carried on the body and a power source for the traction system. The power source includes at least one engine generator set. In addition, the locomotive includes at least one auxiliary load and a bus connecting the power source, the traction system and the auxiliary load. Further, the locomotive includes a ground tether circuit comprising an adjustable voltage converter.

In accordance with yet another aspect, a locomotive comprises a body, an AC traction system carried on the body, a power source for the traction system including at least one engine generator set, at least one auxiliary load and a bus connecting the power source, the traction system and the auxiliary load. In addition, the locomotive includes a ground tether circuit including a rectifier and an adjustable voltage converter.

In the following description there is shown and described several different embodiments of switching ground tether circuits for different power circuits and of locomotives incorporating such ground tether circuits. As it should be realized, all disclosed embodiments are capable of modification in various, obvious aspects all without departing from the ground tether circuits described and set forth in the following claims. Accordingly, the drawings and descriptions will be regarded as illustrative in nature and not as restrictive.

BRIEF DESCRIPTION OF THE DRAWINGS

The accompanying drawings incorporated herein form a part of the specification, and illustrate several aspects of the switching ground tether circuits described in this document. In the drawings.

Reference will now be made in detail to the present preferred embodiments of the switching ground tether circuit, examples of which are illustrated in the accompanying drawings.

DETAILED DESCRIPTION OF THE PREFERRED EMBODIMENTS

By applying solid state power conversion concepts, a versatile grounding system may be constructed which can act as a dynamic system grounding potential. This will allow for varying the amount of ground current allowed as well as calculating the voltage at the location of the fault.

Figure 2:
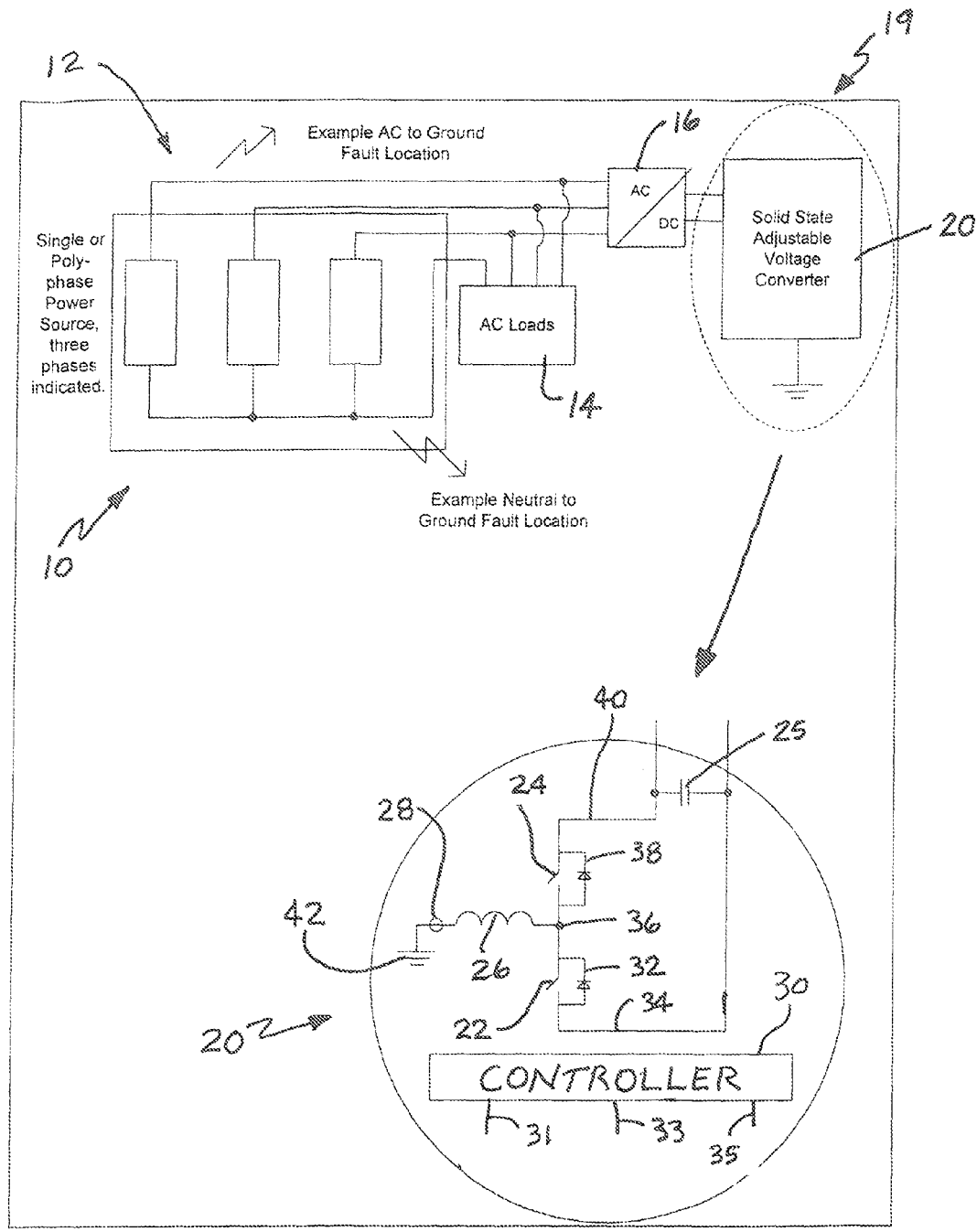
FIG. 2 is a schematic diagram of a power circuit including an AC power source and at least one AC load as well as a ground tether circuit for that power circuit including a rectifier and an adjustable voltage converter.

FIG. 2 is a sample power system 10 including an AC power source 12 for powering one or more AC loads 14. The power source 12 may comprise a single or polyphase alternating current power source (three phases are illustrated). The AC loads 14 may be substantially any motor or electrical device that operates on alternating current. The grounded neutral on the AC system is eliminated and a new ground connection is made through a switching ground tether circuit 19 to a new dynamic potential on the power system. The switching ground tether circuit 19 includes an adjustable voltage converter 20 that is connected to the power system 10 through the AC to DC converter 16.

As illustrated in FIG. 2, the adjustable voltage converter 20 includes a positive power switch 24, a negative power switch 22, an inductor 26, a current sensing device 28 and a controller 30, such as a dedicated microprocessor. The positive power switch 24 includes a first freewheeling path 38 connected between a positive DC link 40 and a center point 36. The negative power switch 22 includes a second freewheeling path 32 connected between a negative DC link 34 and the center point 36. An optional DC link capacitor 25 is connected between the positive and negative DC links 40, 34. The capacitor 25 may or may not be required depending upon the impedance of the DC links and switching device characteristics.

The inductor 26 is connected between the center point 36 and the system ground 42. The controller 30 is connected to the positive power switch 22, the negative power switch 24 and the current sensing device 28 by the control lines 31, 33 and 35 respectively. The controller 30 functions to control operation of the two power switches 22, 24.

Figure 1:
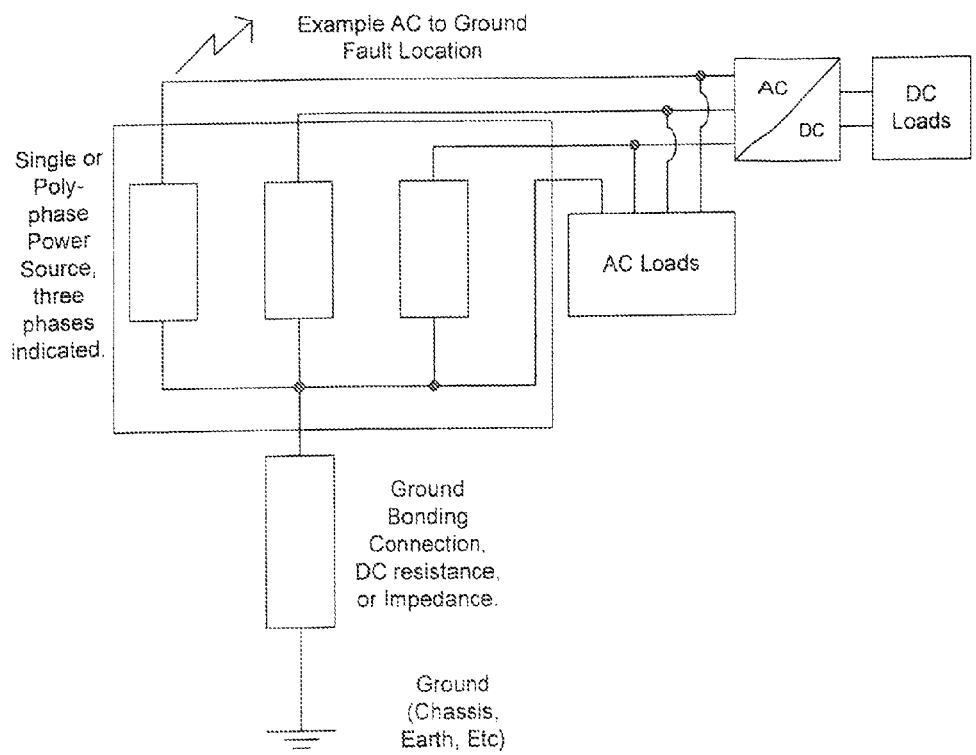
FIG. 1 is a schematic diagram of a prior art high impedance grounding system.

If the adjustable voltage converter 20 is set to produce one half of its input voltage at its output then the output of the converter on average is at the same potential as the neutral point which was grounded in FIG. 1. In this case, the top and bottom transistor switches in the voltage converter are operating at a 50% duty cycle, causing the average voltage at the output of the converter that is connected to ground to be half of the DC link voltage and at a similar potential as the AC neutral voltage. This would be a similar case to the neutral connection in FIG. 1 being connected to ground as the neutral voltage is at a similar potential as half of the DC link voltage.

If there is a connection to ground at the example AC to fault location in FIG. 1, current will flow from the AC phase wire through the fault, through the power system ground connection and then to the neutral of the AC system through any grounding impedances if applicable. The only limit to the ground fault current would be the impedance of the ground connection and the short circuit current capability of the power source. To interrupt this current, a circuit breaker would open removing the supply from the circuit or a ground relay would open removing the ground connection from the neutral.

If there is a connection to ground at the example AC to fault location in FIG. 2, current will flow from the AC phase wire through the fault, through the power system ground connection and then to the power system through the adjustable voltage converter when the switches in the converter are active. When the switches are not active there will be no fault current flow in this system. Because of this, the fault current may now be limited either by disabling the operation of the switches in the adjustable voltage converter or by adjusting the average voltage at the output of the converter to be similar to the voltage at the location in the power system of the fault in order to limit the magnitude of the current flow.

In FIG. 1, if there were a ground fault to the neutral connection of the power system it would not be able to be detected. In FIG. 2, if there is a fault from the location labeled example neutral to ground fault location then it can be detected. The current path would be from the fault through the ground connection to the adjustable voltage converter, through its switches and back to the power system. The magnitude of the fault current could be controlled dynamically as it was in the case of the AC fault example.

Figure 3:
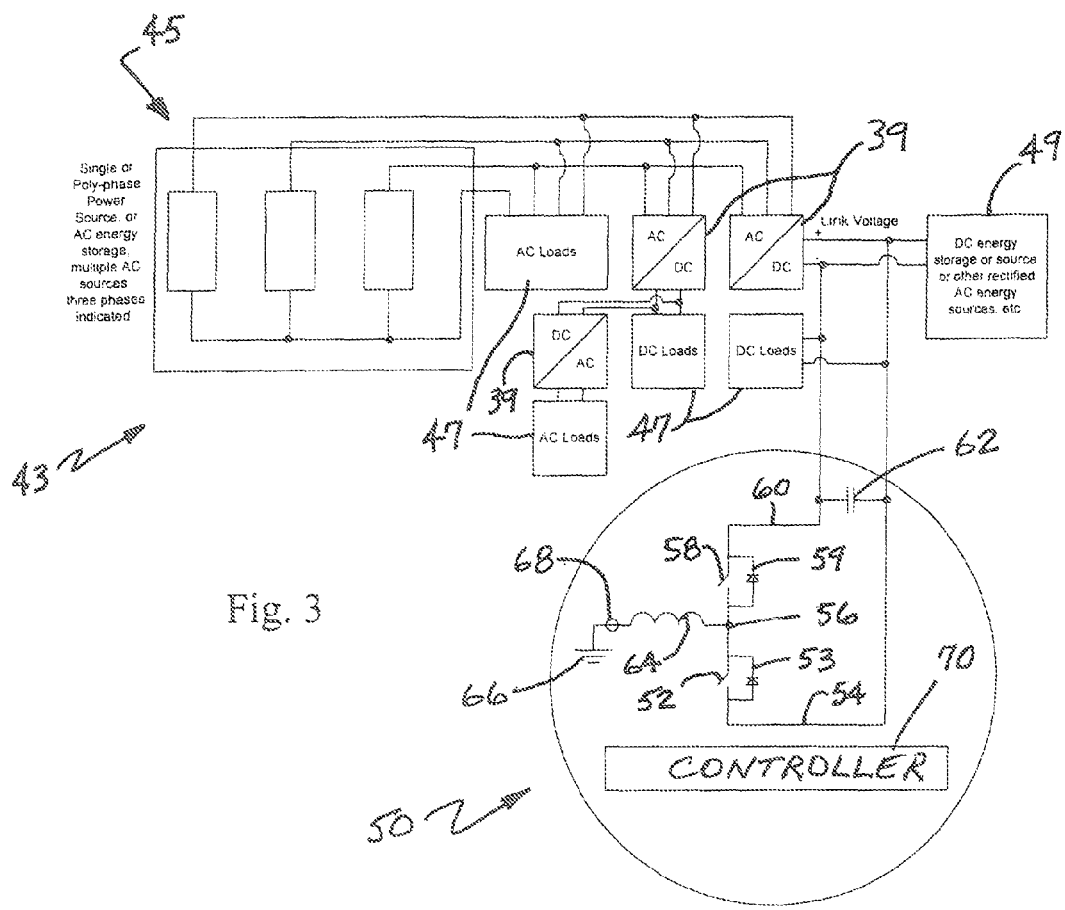
FIG. 3 is a schematic diagram of a power circuit including an AC power source, a DC power source, multiple AC to DC converters connected between the AC power source and the DC power source, multiple AC and DC loads as well as a switching ground tether circuit.

FIG. 3 is a sample power system 43 which could have single or multiple AC or DC energy sources 45, single or multiple AC or DC electrical loads 47 or various energy storage elements 49 connected through appropriate AC to DC converters 39. Indicated in the diagram by a circle is a simplified diagram of the "Switching Ground Tether". In this sample diagram, the switching ground tether circuit 50 is connected to a DC link in the power system. In power systems which would not otherwise have a DC link, a rectifier may be incorporated into the switching tether device (see FIG. 2).

As illustrated in FIG. 3, the switching tether circuit 50 contains a buck boost power stage made up of: (a) a positive power switch 58 with a freewheeling path 59 connected between the positive DC 60 link and a center point 56, (b) a negative power switch 52 with a freewheeling path 53 connected between the negative DC link 54 and a center point 56, (c) an optional DC link capacitor 62 connected between the positive and negative DC links 54, 60 which may or may not be required depending on the impedance of the DC link and switching device characteristics, (d) an inductance 64 (either an intentionally placed inductor or stray inductance in the circuit) connected between the center point 56 of the switches and system ground 66 (power system equipment grounding conductor system, or power system grounding electrode, or vehicle system chassis, etc) through a path inclusive of a current sensing device 68, (e) a current sensing device 68 which may be a current shunt with a measured voltage drop which is related to the current or a device which detects fields which are related to current and produces a signal which is related to the current either directly or indirectly through active or passive means, (f) a controller or a means 70 of analog and or digital signal processing which controls the operation of the positive and negative power switches, as well as produces a signal or signals related to the status of the system isolation based on the operation of the power switches and measured parameters such as current level sensed to ground and optionally information such as the voltage on the DC link, etc, and (g) other optional equipment such as a current limited voltage source below the nominal system operating voltage for providing power to the DC link when the link is offline, and a traditional high impedance ground tether circuit with diodes to remove itself from the circuit path when the power system is at operational voltage (see FIG. 6 embodiment described below).

The switching of the positive switch 58 and the negative switch 52 in the tether circuit 50 in an appropriate manner develops an average voltage at the center location of the switching devices. For example, if the average voltage is near the link positive voltage then a ground fault on a positive link in the system will have little current flow where a ground fault on a negative link in the system will have higher current flow. By varying the average voltage at the center of the two switches, ground faults at any system potential may be identified, including faults at the center tap of the AC supply or any other location which may otherwise not be detectable by systems which bond the power system to ground, directly or through impedance at a fixed potential.

Because the average potential of the grounding point may be varied, in the case of a fault, the maximum ground fault current may be limited dynamically by adjusting the switching of the top and bottom switches 58, 52 using current regulation means to keep the average potential of the grounding point sufficiently close to the system potential at the location of the fault to limit the fault current. The switching of the top and bottom switches 58, 52 would be adjusted at a sufficiently high bandwidth such that if a low impedance fault to ground is at an AC portion of the electrical system, the current regulator could adjust the center tap voltage dynamically to track the AC voltage potential of the fault and enforce the current limit.

If the fault to ground is of a sufficiently high resistance such that a current limit is not reached, the fault current may be measured at one or more average center point voltages. The magnitude of the fault current may be used as an indication for the impedance of the fault to ground and change in fault current at different average center voltages can be an indicator to the potential of the power system where the fault to ground is located.

For example, if the average tether current is varied from 0% of the system voltage, 50% of the system voltage and 100% of the system voltage and the fault current is measured to be 0, 1 and 2 current units then it is likely that the system fault is on a negative DC link location in the system. If the average fault current readings at these duty cycles are say 1, 0 and 1 current units then the system fault is on an AC portion of the power system. If the average fault current readings at these duty cycles are say 2, 1, 0 then the fault is on a positive DC link location in the power system.

When the system is in a current regulation mode, in the case of an AC fault, the variation of the center voltage to enforce the current regulation is dependent on which phase the fault is located in. By comparing the average center voltage created by the current regulator to the AC voltages in the power system, the phase the fault is occurring can be determined.

If there are multiple AC sections of the power system operating at different frequencies (asynchronous power sources connected to a common DC link through rectifiers or inverters, or AC motor loads powered by variable frequency drives connected to AC or DC locations in the power system) and there is a fault on an AC system sufficient to cause the current regulator in the switching tether to regulate current then the frequency of the change in center tap voltage by the current regulator correlates to the frequency of the AC section of the power system where the fault has occurred. In the case of a detected AC fault, such a system may adjust the current limit dynamically to activate the current regulator and than adjust the frequency of the various AC sections of the power system one at a time until a corresponding variation in the center tap voltage frequency is identified (Or instead of varying the frequencies, if the systems happen to be operating at different frequencies a direct comparison may be made to the variation of the center voltage). At this point, the AC section of the system with the ground is identified. By comparing the center tap voltage to the AC voltages in that section of the power system the phase the fault is located on may further be determined.

The switching center tap signal processing may be implemented inside a higher level system controller 70 or may be a standalone unit. The results of the signal processing may be used to indicate faults to system operators, create automatic actions such as adjusting operating parameters, disabling or isolating equipment identified as having a ground fault and/or disabling energy into the power system. The action taken may be dependent on the equipment and system design, the magnitude of the ground fault impedance calculated from the signal processing, the duration of the ground fault, operating conditions of the equipment internally, and/or operating conditions of the equipment externally. For example, a slight ground in a generator after initial startup on a cold damp day may call for the generator to be operated at reduced power for a specified time duration after it is brought up to temperature to eliminate moisture.

The same ground leakage on a generator which has been running at high power and is in a higher temperature and lower humidity ambient condition may call for the generator to be brought off line to protect the insulation from thermal damage.

The solid state adjustable voltage converter 20 or 50 may be constructed with transistors for switches 22, 24, 52, 58 and diodes for the freewheeling path 32, 38, 53, 59 or with transistors controlled to act as diodes for the freewheeling path. Typically, the transistors could be IGBTs or MOSFETs depending on the voltage levels involved and the desired maximum fault current. If MOSFETs are used, the transistors typically have built in body diodes and are suited to act as a diode if energized using a synchronous rectification scheme. External freewheeling diodes may also be used if desired in conjunction with MOSFETs. If IGBTs are used, a freewheeling diode must also be used. This diode may be included in the same package as the IGBT or it may be a separate device. A typical IGBT with an appropriate freewheeling diode built in may be similar to IXYS IXGT24N170AH1 which with the proper thermal packaging and environment could be suitable for operation at 1 A of fault current at a 1200V DC link voltage.

The solid state adjustable voltage converter 20, 50 may be constructed with an inductor 26, 64 of enough inductance such that the transistor may respond to a fault before the fault current exceeds a design limit. Optionally, the inductance could be large enough such that a fault current may be regulated by alternating the two transistors in the converter 20, 50 without the ripple current through the inductor exceeding a design limit. This inductance could be a fixed component, several components in series, or simply traces on a circuit board or wires with enough inductance to satisfy the requirements of the system.

The solid state adjustable voltage converter 20, 50 may be constructed with a current sensing element 28, 68 composing of an active current sensor, a passive current sensor or a current shunt. Examples of active and passive current sensors would be hall sensors, flux gate sensors, current transformers, and saturation based current sensors such as a mag-amp. A current shunt could be a resistor or a section of conductor of a known resistance which has the voltage drop across it measured. An example of this would be a 1.0 Ohm resistor with a differential op-amp circuit measuring the voltage drop across it As indicated above, the controller 30, 70 may comprise a dedicated microprocessor. The controller 30, 70 functions to modulate the positive and negative switches 22, 24, 52, 58 in response to operating mode and in a manner that regulates or limits the output current and can adjust the average output voltage when not current limited. In addition to a dedicated microprocessor, there are several hardware only, software only and specialized switch mode supply or motor controller purposed integrated circuits which combine specialized hardware and software. One such product line useful for the intended purpose is the Texas Instrument C2000 product line.

Figure 4:
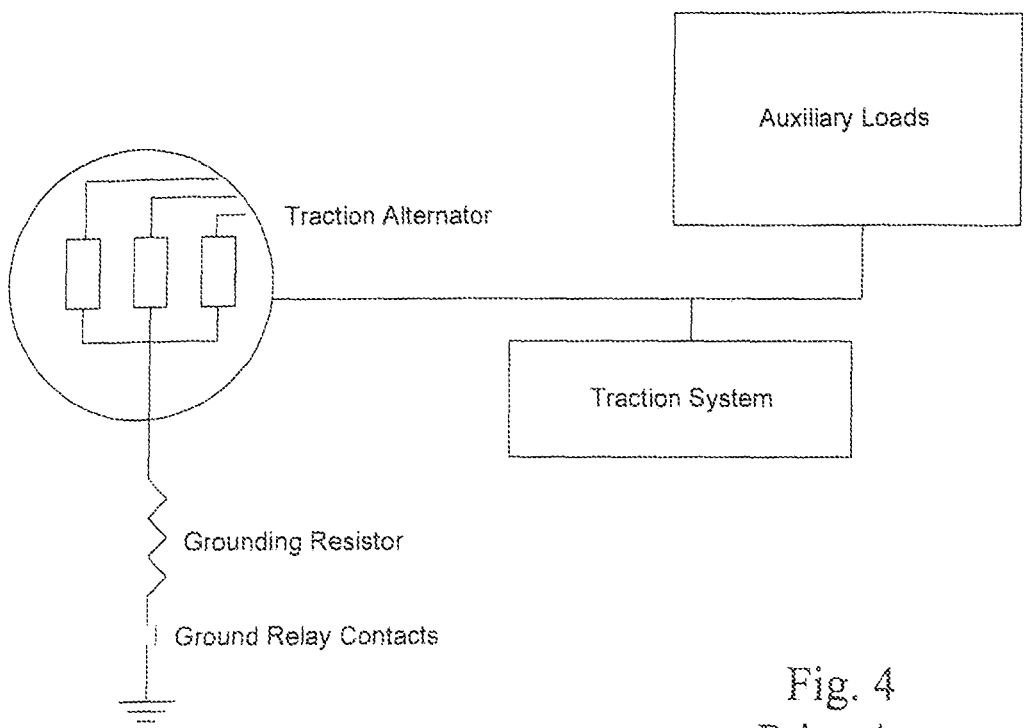
FIG. 4 is a schematic diagram illustrating a typical, state-of-the-art grounding scheme on a locomotive.

FIG. 4 is a block diagram for a typical, state of the art, grounding scheme on a locomotive. The center tap of the neutral connection on the traction alternator is connected to ground through a ground relay and a grounding resistor. Often, the grounding resistor is sized to only be able to operate momentarily without damage in the event of a fault on the power system. The ground relay is designed to disconnect the grounding resistor from the circuit to prevent damage to the grounding resistor. Note that this configuration is not readily adaptable to supporting multiple energy sources that may be operated independently nor would this system be able to detect faults at the neutral point of the traction alternator or at the center of any auxiliary AC loads such as a ground fault at a neutral point in the windings of a motor.

Figure 5:
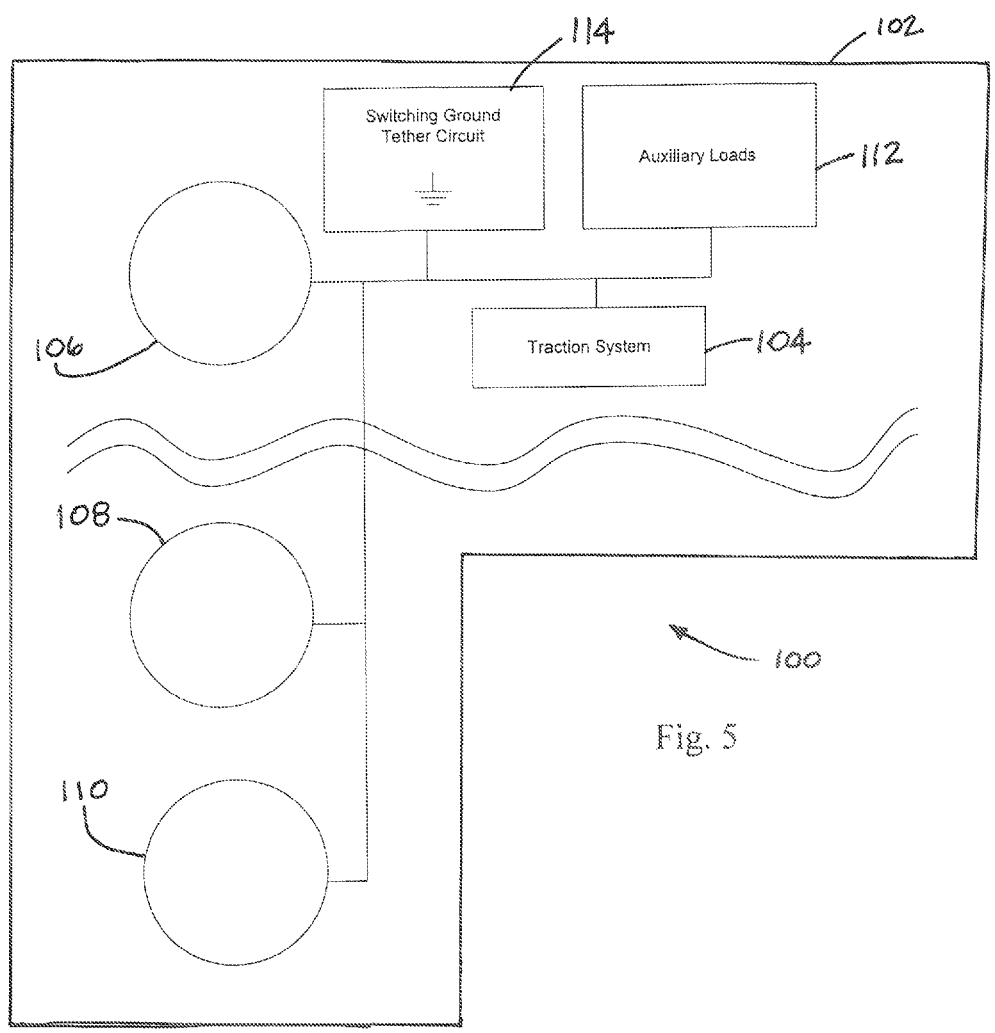
FIG. 5 is a schematic block diagram illustrating a grounding scheme on a locomotive incorporating the switching ground tether circuit described in detail in this document.

FIG. 5 is a block diagram of a locomotive system incorporating a switching ground tether circuit. In this configuration there is no need to access the neutral location on the power source. With this configuration a ground fault on the neutral in the power system for example at the center point of one of the power sources or the center of an AC motor would be detectable.

With the system in FIG. 5, the level of a fault current may also be regulated actively instead of counting on the functionality of a ground relay to turn off ground fault current prior to damage to the grounding resistor in the case of a ground fault. As illustrated, the locomotive 100 includes a body 102 carrying an AC traction system 104 and a power source including one or more engine generator sets. Three generator sets 106, 108, 110 are illustrated but substantially any other number could be provided. The locomotive 100 also carries one or more auxiliary loads 112 and a switching ground tether circuit 114 of the type illustrated in FIG. 2 and described above.

Figure 6:
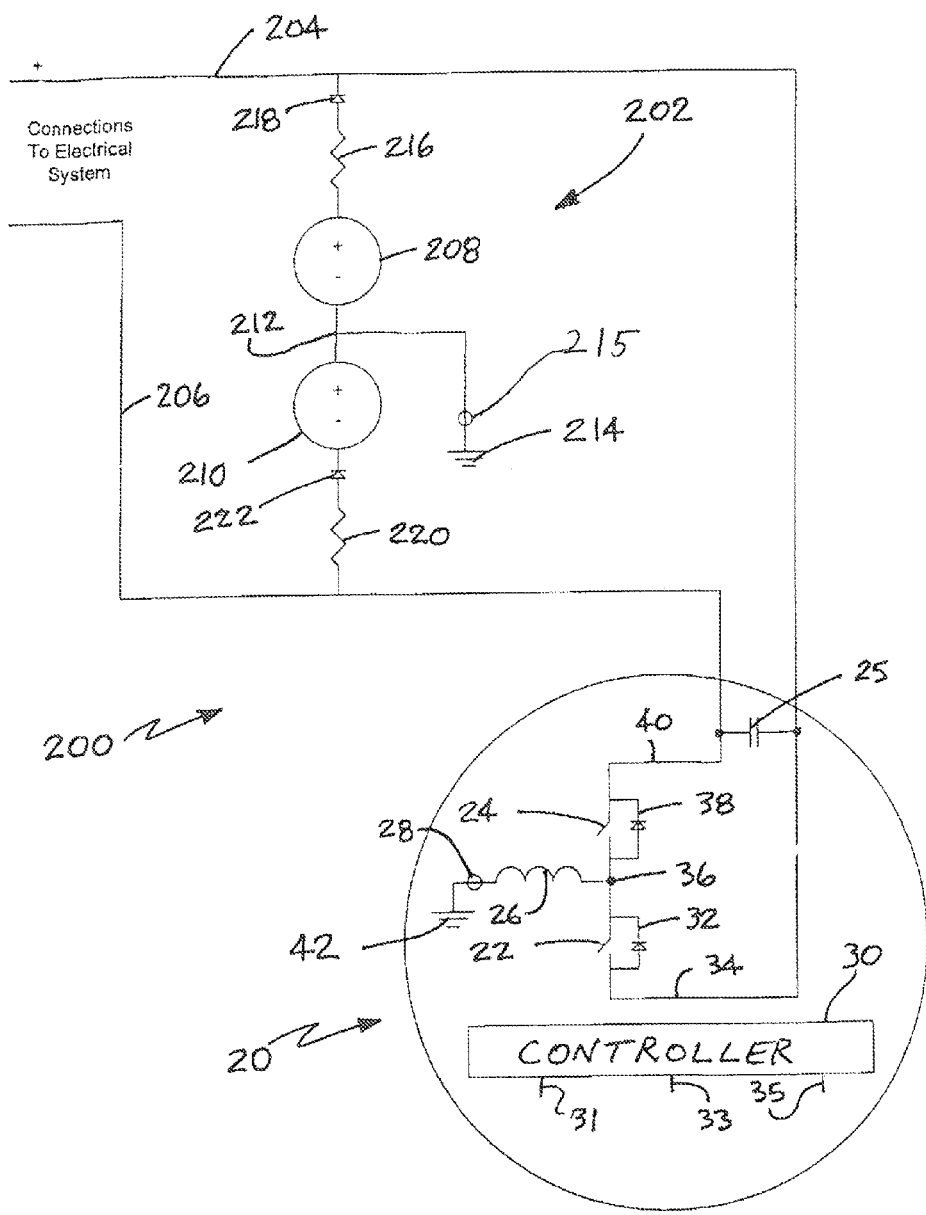
FIG. 6 is a schematical diagram illustrating an additional embodiment of ground tether circuit incorporating an optional current limited voltage source.

FIG. 6 illustrates an alternative embodiment of switching ground tether circuit 200 incorporating an optional current limited voltage source, generally designated by reference number 202, connected between a positive D.C. link 204 and a negative DC link 206. The current limited voltage source 202 includes a first isolated power supply 208 and a second isolated power supply 210 connected between the position and negative DC links 204 and 206 on opposite sides of a second center point 212 that is connected to ground 214. The current limited voltage source 202 further includes a first current limiting resistor 216 and a first blocking diode 218 connected between the first isolated power supply 208 and the positive DC link 204 and a second current limiting resistor 220 and second blocking diode 222 connected between the second isolated power supply 210 and the negative DC link 206. As should be appreciated, the circuit 200 also includes an adjustable voltage converter 20 of the type described above and illustrated in FIG. 2. That voltage connector 20 includes the same reference numbers to identify the same components.

In one possible application, the two isolated power supplies 208, 210 are 24 volt supplies with the ground connection in the center 214. Such supplies 208, 210 are low voltage compared to the power circuit to which they are connected.

When the power circuit is powered down, the isolated voltage generated by the isolated power supplies 208, 210 is applied across the DC links 204, 206 through the current limiting resistors 216, 220. The ground isolation can then be determined by comparing the ratio of the measured system voltage to the measured current through the current transducer or current shunt resistor 215 in the center connection from the power supplies 208, 210 going to the ground 214. The switches 22, 24 of the adjustable voltage connector 20 are kept disabled during this mode of operation.

The foregoing description of the preferred embodiments of the ground tether circuit have been presented for purposes of illustration and description. It is not intended to be exhaustive or to limit the ground tether circuit to the precise form disclosed. Obvious modifications or variations are possible in light of the above teachings. The embodiments were chosen and described to enable one of ordinary skill in the art to utilize the ground tether circuit in various embodiments and with various modifications as are suited to the particular use contemplated. The drawings and preferred embodiments do not and are not intended to limit the ordinary meaning of the claims in their fair and broad interpretation in any way.

What is claimed:

1. A ground tether circuit for a power circuit including a power source and at least one load and at least one rectifier, said ground tether circuit comprising:
   an adjustable voltage converter connected to said at least one rectifier, said adjustable voltage converter including:
   (a) a positive power switch with a first freewheeling path connected between a positive DC link and a center point;
   (b) a negative power switch with a second freewheeling path connected between a negative DC link and said center point;
   (c) an inductor connected between said center point and system ground;
   (d) a current sensing device connected between said inductor and the system ground; and
   (e) a controller controlling operation of said positive power switch and said negative power switch, said controller being connected to said positive power switch, said negative power switch and said current sensing device.

2. The ground tether circuit of claim 1, further including a DC link capacitor connected between said positive DC link and said negative DC link.

3. The ground tether circuit of claim 1, wherein said positive power switch and said negative power switch are transistors.

4. The ground tether circuit of claim 3, wherein said first freewheeling path and said second freewheeling path are diodes.

5. The ground tether circuit of claim 3, wherein said first freewheeling path and said second freewheeling path are transistors controlled to act as diodes.

6. The ground tether circuit of claim 5, wherein said transistors are selected from a group consisting of MOSFETs, IGBTs and combinations thereof.

7. The ground tether circuit of claim 1, wherein said current sensing device is selected from a group consisting of an active current sensor, a passive current sensor and a current shunt.

8. The ground tether circuit of claim 7, wherein said current sensing device is selected from a group of components consisting of a hall sensor, a flux gate sensor, a current transformer, a saturation based current sensor, a mag-amp, a resistor, and a section of conductor of known resistance that has a voltage drop across said section of conductor measured.

9. The ground tether circuit of claim 1, further including a current limited voltage source including a first isolated power supply and a second isolated power supply on each side of a second center point connected to a center ground.

10. The ground tether circuit of claim 9, further including a first current limiting resistor and first blocking diode connected between said first isolated power supply and said positive DC link and a second blocking diode and second current limiting resistor connected between said second isolated power supply and said negative DC link.

11. A ground tether circuit connected to a power system including multiple power sources comprising at least one AC power source and/or DC power source, at least one AC to DC converter connected between each of said AC power source and a common DC link connecting to all of the power sources and/or loads directly or through converters and said ground tether circuit comprising:
   an adjustable voltage converter, said adjustable voltage converter including:
   (a) a positive power switch with a first freewheeling path connected between a positive DC link and a center point;
   (b) a negative power switch with a second freewheeling path connected between a negative DC link and said center point;
   (c) an inductor connected between said center point and system ground;
   (d) a current sensing device connected between said inductor and the system ground; and
   (e) a controller controlling operation of said positive power switch and said negative power switch, said controller being connected to said positive power switch, said negative power switch and said current sensing device.

12. The ground tether circuit of claim 11, further including a DC link capacitor connected between said positive DC link and said negative DC link.

13. The ground tether circuit of claim 11, wherein said positive power switch and said negative power switch are transistors.

14. The ground tether circuit of claim 13, wherein said first freewheeling path and said second freewheeling path are diodes.

15. The ground tether circuit of claim 13, wherein said first freewheeling path and said second freewheeling path are transistors controlled to act as diodes.

16. The ground tether circuit of claim 15, wherein said transistors are selected from a group consisting of MOSFETs, IGBTs and combinations thereof.

17. The ground tether circuit of claim 11, wherein said current sensing device is selected from a group consisting of an active current sensor, a passive current sensor and a current shunt.

18. The ground tether circuit of claim 17, wherein said current sensing device is selected from a group of components consisting of a hall sensor, a flux gate sensor, a current transformer, a saturation based current sensor, a mag-amp, a resistor, a section of conductor of known resistance that has a voltage drop across said section of conductor measured.

19. The ground tether circuit of claim 11, further including a current limited voltage source including a first isolated power supply and a second isolated power supply on each side of a second center point connected to a center ground.

20. The ground tether circuit of claim 19, further including a first current limiting resistor and first blocking diode connected between said first isolated power supply and said positive DC link and a second blocking diode and second current limiting resistor connected between said second isolated power supply and said negative DC link.

21. A locomotive comprising:
a body;
a DC traction system carried on said body;
a power source for said traction system, said power source including at least one engine generator set;
at least one auxiliary load;
a bus connecting said power source, said traction system and said at least one auxiliary load; and
a ground tether circuit in the form of an adjustable voltage converter including:
  (a) a positive power switch with a first freewheeling path connected between a positive DC link and a center point;
  (b) a negative power switch with a second freewheeling path connected between a negative DC link and said center point;
  (c) an inductor connected between said center point and system ground;
  (d) a current sensing device connected between said inductor and the system ground; and
  (e) a controller controlling operation of said positive power switch and said negative power switch, said controller being connected to said positive power switch, said negative power switch and said current sensing device.

22. A locomotive, comprising:
a body;
an AC traction system carried on said body;
a power source including at least one engine generator set;
at least one auxiliary load;
a bus connecting said power source, said traction system and said at least one auxiliary load; and
a ground tether circuit including a rectifier and an adjustable voltage converter connected to said rectifier, said adjustable voltage converter including:
  (a) a positive power switch with a first freewheeling path connected between a positive DC link and a center point;
  (b) a negative power switch with a second freewheeling path connected between a negative DC link and said center point;
  (c) an inductor connected between said center point and system ground;
  (d) a current sensing device connected between said inductor and the system ground; and
  (e) a controller controlling operation of said positive power switch and said negative power switch, said controller being connected to said positive power switch, said negative power switch and said current sensing device.

* * * * *